United States Patent
Kehr

(10) Patent No.: US 11,699,939 B2
(45) Date of Patent: Jul. 11, 2023

(54) ELECTRIC MACHINE

(71) Applicant: ZF Friedrichshafen AG, Friedrichshafen (DE)

(72) Inventor: Ulrich Kehr, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/524,102

(22) Filed: Nov. 11, 2021

(65) Prior Publication Data
US 2022/0224203 A1    Jul. 14, 2022

(30) Foreign Application Priority Data

Jan. 14, 2021   (DE) ...................... 10 2021 200 283.8

(51) Int. Cl.
| | |
|---|---|
| *H02K 9/193* | (2006.01) |
| *H02K 7/00* | (2006.01) |
| *H02K 9/19* | (2006.01) |
| *H02K 9/06* | (2006.01) |

(52) U.S. Cl.
CPC ............. *H02K 9/193* (2013.01); *H02K 7/003* (2013.01); *H02K 7/006* (2013.01)

(58) Field of Classification Search
CPC .. H02K 9/00; H02K 9/19; H02K 1/20; H02K 1/32; H02K 7/00; H02K 9/06
USPC ..................... 310/54, 56, 61, 60 A, 60 R, 58
See application file for complete search history.

(56) References Cited

U.S. PATENT DOCUMENTS 8,502,424 B2    8/2013  Esse

FOREIGN PATENT DOCUMENTS

| CN | 108880106 A | 11/2018 | |
| CN | 208544105 U | * 2/2019 | |
| DE | 102008001622 A1 | 11/2009 | |
| DE | 102019007870 A1 | 7/2020 | |
| JP | 2014230408 A | * 12/2014 | |
| WO | WO 2017/050447 A1 | 3/2017 | |
| WO | WO-2018145841 A1 | * 8/2018 | ............. F03D 80/60 |

OTHER PUBLICATIONS

German Office Action DE 10 2021 200 283.8, dated Jun. 21, 2021. (14 pages) (Includes CN108880106 Machine Translation).

* cited by examiner

*Primary Examiner* — Jose A Gonzalez Quinones
(74) *Attorney, Agent, or Firm* — Dority & Manning, P.A.

(57) ABSTRACT

An electric machine (10) includes a housing (12), a stator (20) fixed within the housing (12), a rotor (30) with a rotor shaft (32), an air gap (24) formed between the rotor (30) and the stator (20), and a cooling device (14) configured for liquid cooling of the electric machine (10). The rotor shaft (32) defines an axial bore (36) in an axial direction, which extends at least partially into the rotor (30). The rotor (30) defines a radially extending air duct (40), which extends from an inner side (42) contacting the rotor shaft (30) to an outer side (44) facing the air gap (24). The rotor shaft (32) defines a bore (46), which is aligned with the air duct (40) such that air is flowable out of the rotor shaft (32) into the air gap (24).

14 Claims, 2 Drawing Sheets

ELECTRIC MACHINE

CROSS-REFERENCE TO RELATED APPLICATION

The present application is related and has right of priority to German Patent Application No. 102021200283.8 filed in the German Patent Office on Jan. 14, 2021, which is incorporated by reference in its entirety for all purposes.

FIELD OF THE INVENTION

The present invention relates generally to an electric machine having a housing, a stator stationarily arranged in the housing, a rotor including a rotor shaft, and a cooling device for the liquid cooling of the electric machine, and to a method for generating an air flow in an air gap between the stator and the rotor of an electric machine.

BACKGROUND

Electric machines for drive engineering include, due to the principle thereof, a stator and a rotor. The stator generally includes stator plates and a suitable coil winding, by which a magnetic field is generated in order to set the rotor into rotation. Electric machines are generally designed in the shape of a cylinder, wherein the external cylindrical stator surrounds the internal rotor, which is also cylindrical. At the axial ends of the stator, the coil winding forms a winding overhang, in which a large number of current-carrying conductors is routed in a comparatively small volume. Due to the tight arrangement of the current conductors, the winding overhang is usually the hottest area of an electric machine, in particular due to the superposition of the phases of the coil windings in this area.

Cooling is provided in order to increase the continuous power of an electric machine. In the case of electric machines for the traction of electric and hybrid vehicles, a jacket cooling, for example, takes place at the stator with the aid of liquid coolants, which are frequently oil- or water-based. Oil-based coolants absorb the heat losses, for example, directly at the current-carrying conductors and carry the heat losses away. Alternatively, a winding overhang cooling takes place in order to reduce the heat losses.

In order to improve a winding overhang cooling using oil-based coolants, DE 10 2008 001 622 A1, for example, describes a coolant spraying device for spraying the electric machine with an oil-based, liquid coolant. The cooling takes place at the axial end faces of the stator and at the winding overhangs present there. A proposed coolant circuit includes a coolant reservoir in order to adjust the flow rate of the liquid coolant of the coolant spraying device in such a way that no coolant of a sump pan is blocked to such an extent that the coolant enters the air gap between the stator and the rotor.

A winding overhang cooling with oil-based coolants proves to be a suitable measure for dissipating the heat and, thereby, reducing the thermal losses. In this way, it is possible to bring the obtainable continuous power of electric machines close to the peak performance. This means that the installation space of the electric machines can be reduced due to a higher power density and torque density, which is valuable, in particular, with respect to traction machines in vehicles.

Nevertheless, it is shown in practical applications that oil penetrates the air gap between the stator and the rotor and, thus, can result in additional, undesired, rotational speed-dependent, fluid dynamic friction between the stator and the rotor. During the operation of the electric machine, the oil must first be transported out of the air gap. This can take place due to the rotation effect of the rotor, although this has the disadvantage that greater losses initially occur during the start-up of the machine. Oil can enter the air gap also during the operation of the electric machine, for example, from the axial ends of the stator, which results in a reduction of the effectiveness of the motor.

SUMMARY OF THE INVENTION

Example aspects of the present invention provide an improved electric machine, the effectiveness of which is increased and the losses of which are reduced.

Example aspects of the present invention relate, in a first example aspect, to an electric machine, preferably as a traction drive in a vehicle, having a housing, a stator stationarily arranged in the housing, a rotor including a rotor shaft, an air gap forming between the rotor and the stator, and a cooling device for the liquid cooling of the electric machine. The rotor shaft has an axial bore in the axial direction, which extends at least partially into an area of the rotor. The rotor has a radially extending air duct, which extends from an inner side contacting the rotor shaft to an outer side facing the air gap. The rotor shaft has a bore, which is aligned with the air duct in such a way that air is flowable from the rotor shaft into the air gap.

In one further example aspect, the present invention relates to a system including an electric machine, as described above, and an air supply device for supplying air into the rotor shaft of the electric machine, wherein the air supply device includes a pump in order to pump air into the rotor shaft and generate an air flow through the air duct into the air gap.

Further example aspects of the invention relate to a vehicle including an electric machine and to a method for generating an air flow in an air gap between the stator and the rotor of an electric machine.

It is understood that the features, which are mentioned above and which will be described in greater detail in the following, are usable not only in the particular combination indicated, but also in other combinations or alone, without departing from the scope of the present invention.

An electric machine including a housing is provided, which is suitable, in particular, as a traction machine for an electric vehicle or a hybrid vehicle. The electric machine includes a stator, which is stationarily arranged in the housing, a rotor having a rotor shaft, and a cooling device for the liquid cooling of the electric machine. The stator and the rotor are arranged in such a way that an air gap forms between the stator and the rotor. The rotor shaft is a hollow shaft and has an axial bore in the axial direction, which extends at least partially so far in the axial direction that the axial bore is arranged in an area of the rotor. The axial bore therefore overlaps at least one area of the rotor in the axial direction. According to example aspects of the invention, the rotor has a radially extending air duct, which extends from an inner side of the rotor, which contacts the rotor shaft, to an outer side of the rotor, which faces the air gap. The rotor shaft has a bore, which is aligned with the air duct of the rotor in such a way that air is flowable out of the rotor shaft into the air gap. The bore of the rotor shaft is arranged in the outer wall of the rotor shaft and connects the axial bore of the rotor shaft to the radially extending air duct.

The axial bore of the rotor shaft is preferably designed as a blind hole and open toward one end of the rotor shaft, and so air from the end face of the shaft can enter the axial bore of the rotor shaft.

The design of the electric machine according to example aspects of the invention makes it possible to generate a flow of air, which flows through the axial bore of the rotor shaft and the bore at the outer wall of the rotor shaft into the air duct. The air flows radially through the air duct, enters the air gap and is distributed there. The air flows away from the air duct toward the outer ends of the electric machine, i.e., toward the end faces of the rotor and of the stator. Due to the arising air flow in the air gap, oil that has penetrated the air gap for the liquid cooling of the electric machine by the cooling device is displaced and transported outward, i.e., toward the two ends of the electric machine. In this way, not only is oil located in the air gap transported outward. In addition, oil for a winding overhang cooling of the electric machine is prevented from penetrating the air gap from the axial end face. The air gap is kept free of oil, at the least largely free of oil in such a way that residues of oil have no significance for the basic operation. Ventilation losses in the air gap are kept low and the effectiveness of the electric machine is increased without dispensing with a liquid cooling of the electric machine with oil.

In one example embodiment, the air duct of the rotor is arranged closer to the center of the rotor in the axial direction. Moreover, the radial bore in the rotor shaft is aligned with the air duct. The essentially central arrangement of the air gap in the axial extension of the rotor has the advantage that air flowing into the air gap is more uniformly distributed than in the case of an eccentric arrangement and is guided in approximately identical amounts to the two opposite axial ends of the air gap.

In one further example embodiment of the invention, the electric machine has two or more air ducts in the rotor. As a result, it is possible to increase the air volume and, thereby, more quickly clear oil from the air gap between the rotor and the stator and more reliably keep the air gap free of oil.

In one further example embodiment of the invention, the number of air ducts in the rotor is even. Therefore, a number of air ducts is provided that is divisible by two (2). In this way, a rotational symmetry can be generated, and so the arrangement of the air ducts has no effect on the uniformity of the rotation of the electric machine. In one further example embodiment of the invention, the two or more air ducts are arranged at the same axial position of the rotor. The air ducts are all situated in the same plane having the same axial distance from one of the ends of the rotor.

According to one preferred example embodiment, the air ducts are uniformly distributed over the circumference of the rotor in the same axial position. In this way, the inflow of the air into the air gap is further equalized. In addition, the effect on the rotation of the electric machine is the lowest and results in the lowest imbalance.

According to one preferred example embodiment, the air duct in the rotor is formed by a bore. In this way, it can be subsequently introduced into the laminations of the rotor in order to improve an electric machine.

Preferably, the bore that forms the air duct has a diameter from one-tenth of a millimeter (0.1 mm) to approximately five millimeters (5 mm), particularly preferably from one millimeter (1 mm) to two millimeters (2 mm). It can be provided that the diameter of the air duct is established as a function of the axial rotor length or of the radial rotor diameter. The number of the air ducts can also be selected as a function of the diameter. It is also possible to make the number and/or the diameter of the air ducts dependent upon a desired air flow volume.

One further preferred example embodiment of the invention provides that air from an air supply device is guided axially into the axial bore of the rotor shaft and, after passing through the air duct, is deflected into the air gap between the rotor and the stator. The air supply device can include, for example, a chamber that operates as an air reservoir. Air can then be suctioned into the interior of the rotor shaft designed as a hollow shaft, for example, due to the rotation of the rotor. The air is preferably withdrawn from the air chamber, which is preferably open toward the surroundings. Alternatively, the air supply device can utilize air from the surroundings of the electric machine.

The system according to one further example aspect of the invention includes the electric machine described here as well as an air supply device for supplying air into the rotor shaft of the electric machine. The air supply device, as part of the system, is preferably an active device that includes a pump, by which air is pumped into the rotor shaft. In this way, an air flow is generated, which pumps air into the axial bore of the hollow shaft-like rotor shaft. After passing through the bore in the wall of the rotor shaft and flowing through the air duct, the air flows into the air gap. In this way, it is possible to displace oil located in the air gap also while the rotor is at a standstill. The active air supply is not reliant on air being drawn in due to the motion of the rotor. Rather, air is actively injected into the air gap or is allowed to flow into the air gap. As a result, losses can also be reduced already during the start-up of the electric machine.

One further example aspect of the invention relates to a vehicle including an electric machine of the type described here. The electric machine preferably acts as a traction machine and drives at least one wheel of the vehicle.

The method according to example aspects of the invention for generating an air flow in an air gap between the stator and the rotor of an electric machine with a cooling device for liquid cooling is applied on the above-described electric machine. This machine includes a rotor with a rotor shaft, which has an axial bore, which extends in the area of the rotor. A bore in the outer wall of the rotor shaft is aligned with an air duct, which extends radially in the rotor and extends to an outer side of the rotor facing the air gap. The method includes, as one step, generating an air flow and introducing the air flow into the axial bore of the rotor shaft. One further step is that of guiding the air flow out of the rotor shaft through a bore into the air duct of the rotor. Another step is that of distributing the air flow into the air gap, which is formed between the rotor and the stator. In a further step, the air flows from the air duct to the rotor ends and displaces liquid, which is possibly present, out of the air gap in such a way that the air gap is essentially free of liquid. In the end, the electric machine has an air gap that has no amount of liquid or oil in the air gap that is relevant for the practical application.

BRIEF DESCRIPTION OF THE DRAWINGS

The invention is described and explained in greater detail in the following with reference to a few selected exemplary embodiments in conjunction with the attached drawings, in which.

DETAILED DESCRIPTION

Figure 1:
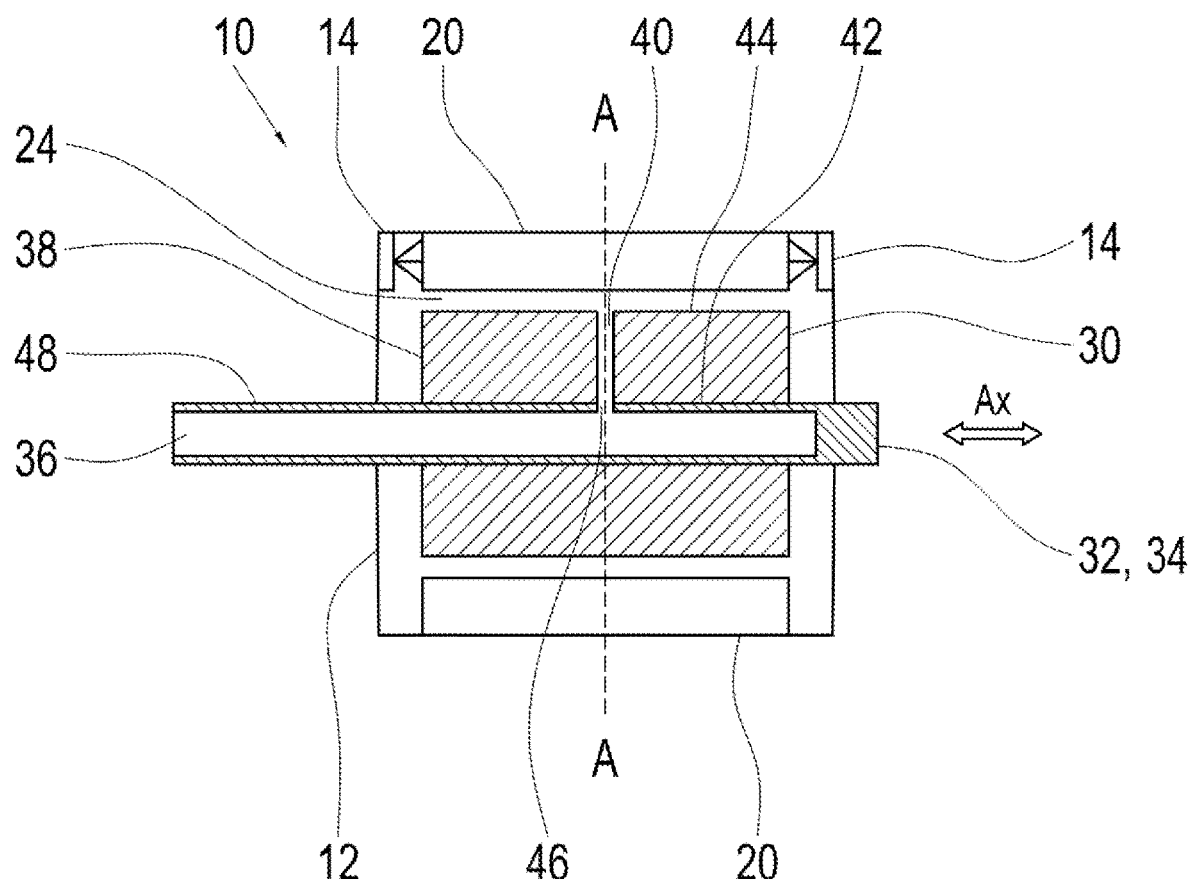
FIG. 1 shows a diagrammatic longitudinal section of an electric machine.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows an electric machine 10 according to example aspects of the invention including a housing 12, in which a stator 20 is stationarily arranged, and including a rotor 30 with a rotor shaft 32. The cylindrically designed electric machine 10 is arranged in such a way that the rotor 30 rotates within the stator 20.

In addition, the housing 12 includes a cooling device 14, which sprays a coolant, preferably an oil-based coolant, onto the axial sides of the stator 20 in order to cool the stator 20. In the diagrammatic section drawing of the electric machine 10, the winding overhangs, which are arranged at the axial ends and are sprayed by the cooling device 14, are not represented.

The stator 20 and the rotor 30 are arranged in such a way that an air gap 24 forms between them. Due to the spraying of the stator 20 with coolant, for example, oil, the coolant can penetrate the air gap 24.

The rotor shaft 32 is designed as a hollow shaft 34 and has an axial bore 36, which extends into the area of the rotor. The axial bore 36 therefore extends, at the least, into a portion of the axial extension of the rotor 30. The rotor 30 has a radially extending air duct 40, which extends from the rotor shaft 32 in the direction of the air gap 24. The air duct 40 is arranged in rotor laminations 38 and can be designed in the form of a bore. The air duct 40 extends from an inner side 42 contacting the rotor shaft 32 to an outer side 44 facing the air gap 24. The air duct can have, for example, a diameter from half of a millimeter (0.5 mm) to five millimeters (5 mm), preferably from one millimeter (1 mm) to three millimeters (3 mm), highly preferably of two millimeters (2 mm).

A bore 46 is arranged in the rotor shaft 32. The bore 46 is arranged in an outer wall 48 in the area of the axial bore 36. The bore 46 is aligned with the air duct 40, and so air flows out of the axial bore 36 into the air duct 40.

The axial bore 36 is arranged in the rotor shaft 32 in such a way that the rotor shaft 32 is open at one of the axial ends of the rotor shaft 32. Due to the arrangement of the axial bore 36, the bore 46, and the air duct 40, an air flow is made possible from the outside through the rotor shaft 32 and the rotor 30 into the air gap 24 between the stator 20 and the rotor 30. The air then flows through the air gap 24 in the direction of the axial end faces of the stator 20 and of the rotor 30. In this way, liquid coolant, such as, for example, oil, which is utilized for spraying the stator 20, is displaced out of the air gap 24.

In FIG. 1, the air duct 40 is centrally arranged in the axial extension of the rotor 30. In this way, a uniform air flow can take place from the air duct 40 in the direction of the two end faces of the rotor 30, and so oil that is possibly present in the air gap 24 can be quickly displaced. The air duct 40 does not need to be centrally arranged in the axial direction (Ax) of the rotor 30. It is advantageous, however, when the air duct 40 is arranged, at the least, farther in the axial center of the rotor 30 than toward the ends.

The dimensions of the air duct 40 can depend on the dimensions of the electric machine. The embodiment shown preferably has an axial length (dimension in the axial direction Ax) of fifty millimeters (50 mm) to two hundred millimeters (200 mm). The rotor diameter preferably has values in the range from eighty millimeters (80 mm) to two hundred millimeters (200 mm). The air duct 40 has a diameter of half of a millimeter (0.5) mm to five millimeters (5 mm).

Figure 2:
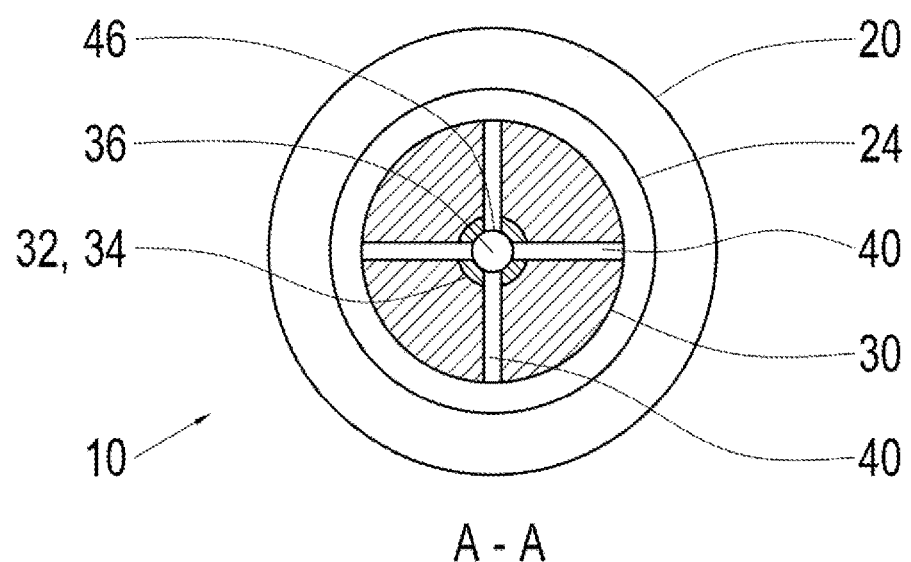
FIG. 2 shows a cross-section of the electric machine along a line A-A from FIG. 1.

FIG. 2 is a section drawing along the line A-A from FIG. 1 and shows an electric machine 10 with four air ducts 40, which are uniformly distributed over the circumference of the rotor. Another, preferably higher number of air ducts 40 can also be provided, of course, in order to displace liquid out of the air gap 24 between the stator 20 and the rotor 30. A non-uniform distribution of the air ducts is also conceivable, for example, in a grouped arrangement.

Figure 3:
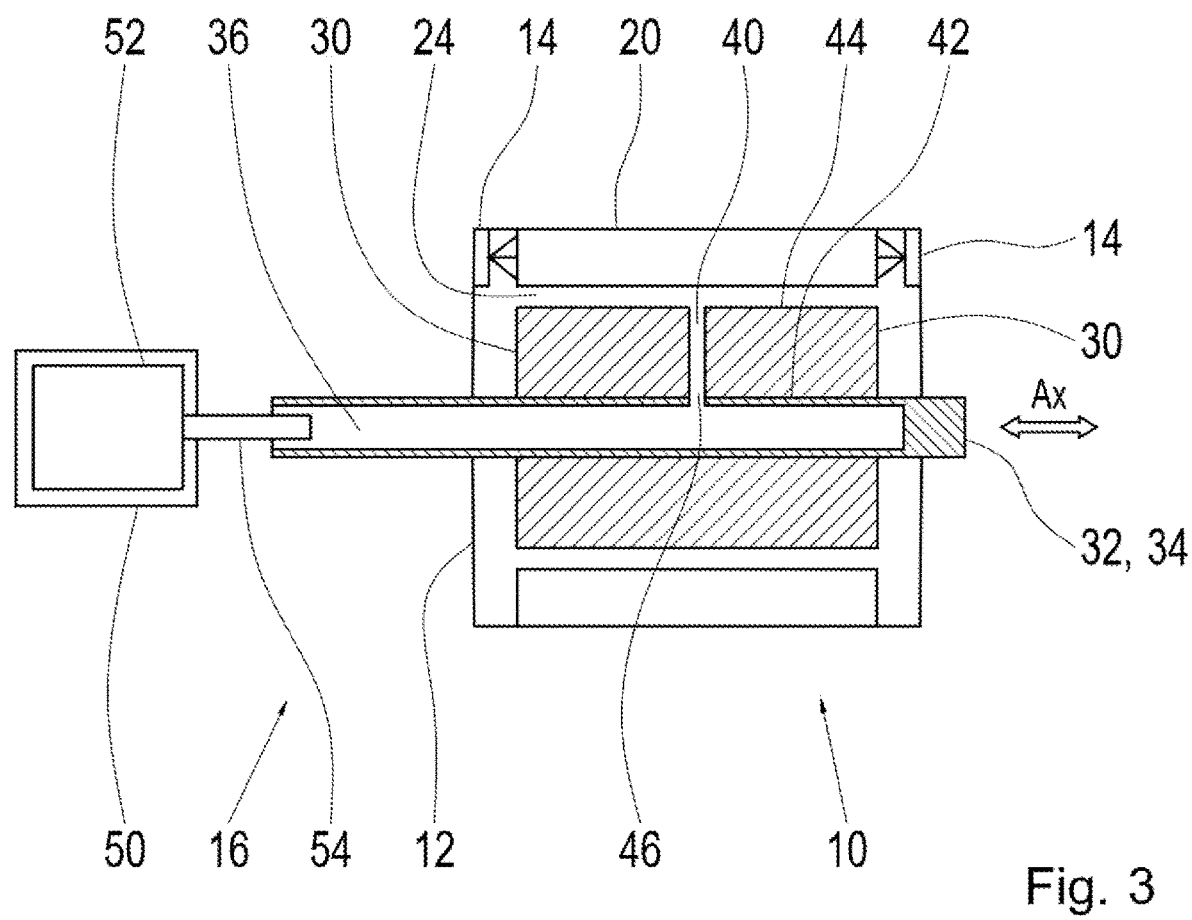
FIG. 3 shows a system including the electric machine from FIG. 1 and an air supply device.

FIG. 3 shows a system 16 including an electric machine 10 and an air supply device 50 for supplying air into the rotor shaft 32 of the electric machine 10. The air supply device 50 includes a pump 52 in order to pump air into the rotor shaft 32. The pump 52 is connected to the rotor shaft designed as a hollow shaft 34 via a, for example, tube-like connection 54. In this way, air can be pumped into the axial bore 36 of the rotor shaft 32, and so an air flow is generated in the axial bore, which is pumped through the air duct 40 or the multiple air ducts 40 into the air gap 24. Air can also already flow through an electric machine 10 at rest, and so fluid, in particular oil-based coolant, is displaced out of the air gap 24 between the stator 20 and the rotor 30 before the machine 10 is set into rotation. Since oil has a higher viscosity than air, the losses of the electric machine can be reduced due to the removal of oil from the air gap 24 and, in fact, even during the start-up phase of the machine. Therefore, the effectiveness and the efficiency of the electric machine 10 are increased overall, which is important, in particular, during the use of the electric machine 10 as a traction motor in a vehicle.

The invention was comprehensively described and explained with reference to the drawings and the description. The description and the explanation are to be understood as an example and are not to be understood as limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. A single element or a single unit can carry out the functions of several of the units mentioned in the claims. The mere mention of a few measures in multiple various dependent claims is not to be understood to mean that a combination of these measures cannot also be advantageously utilized. Reference numbers in the claims are not to be understood as limiting.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 10 electric machine
12 housing
14 cooling device
16 system
20 stator
24 air gap
30 rotor
32 rotor shaft
34 hollow shaft
36 axial bore
38 rotor laminations
40 air duct
42 inner side
44 outer side
46 bore
48 wall
50 air supply device
52 pump
54 connection

The invention claimed is:

1. An electric machine (10), comprising:
a housing (12);
a stator (20) fixed within the housing (12);
an air supply pump (52);
a rotor (30) with a rotor shaft (32), an air gap (24) defined between the rotor (30) and the stator (20); and
a cooling device (14) configured for liquid cooling of the electric machine (10),
wherein the rotor shaft (32) defines an axial bore (36) that extends at least partially into the rotor (30),
wherein the rotor (30) defines a radially extending air duct (40) that extends from an inner side (42) contacting the rotor shaft (30) to an outer side (44) facing the air gap (24), and
wherein the rotor shaft (32) defines a bore (46) that is aligned with the air duct (40) such that air is flowable out of the rotor shaft (32) into the air gap (24),
wherein, when the electrical machine (10) is at a standstill, the air supply pump (52) is operable to pump air into the axial bore (36) of the rotor shaft (32) and through the air duct (40) into the air gap (24) between the rotor (30) and the stator (20) in order to remove cooling liquid from the air gap (24).

2. The electric machine (10) of claim 1, wherein the air duct (24) is arranged closer to the center of the rotor (30) in the axial direction.

3. The electric machine (10) of claim 1, wherein the air duct (24) is arranged at the axial center of the rotor (30).

4. The electric machine (10) of claim 1, wherein the air duct (40) comprises a plurality of air ducts (40) arranged in the rotor (30).

5. The electric machine (10) of claim 4, wherein the air ducts (40) comprises an even number of air ducts (40) arranged in the rotor (30).

6. The electric machine (10) of claim 4, wherein the air ducts (40) are arranged in a common axial position from an end of the rotor (30).

7. The electric machine (10) of claim 1, wherein the air ducts (40) are uniformly distributed over a circumference of the rotor (30) at a common axial position.

8. The electric machine (10) of claim 1, wherein the air duct (40) in the rotor (30) is a bore.

9. The electric machine (10) of claim 8, wherein the bore has a diameter no less than one-tenth of a millimeter and no greater than five millimeters.

10. The electric machine (10) of claim 8, wherein the bore has a diameter no less than one millimeter and no greater than two millimeters.

11. A vehicle, comprising the electric machine (10) of claim 1, wherein the electric machine (10) is configured for driving a wheel of the vehicle.

12. A method for generating an air flow in an air gap (24) between a stator (20) and a rotor (30) of an electric machine (10) with a cooling device (14) configured for liquid cooling, the rotor (30) having a rotor shaft (32) with an axial bore (36) that extends into the rotor (30) and with a bore (46) in a radial direction, the rotor (30) having a radially extending air duct (40) that extends from an inner side (42) contacting the rotor shaft (32) to an outer side (44) facing the air gap (24), the bore (46) in the rotor shaft (32) aligned with the air duct (40), the method comprising:
generating an air flow into the axial bore of the rotor shaft (32);
guiding the air flow out of the rotor shaft (32) through the bore (46) into the air duct (40) of the rotor (30);
distributing the air flow in the air gap (24) between the rotor (30) and the stator (20), and
displacing liquid out of the air gap (24) with the air flow in the air gap (24).

13. The electric machine (10) of claim 1, further comprising a conduit (54) that fluidly couples the air supply pump (52) to the axial bore (36) of the rotor shaft (32).

14. The electric machine (10) of claim 13, wherein the rotor shaft (32) is open at a first end of the rotor shaft (32) and is closed at a second, opposite end of the rotor shaft (32), the conduit (54) connected to the rotor shaft (32) at the first end of the rotor shaft (32).

* * * * *